United States Patent
Kwon (10) Patent No.: US 10,969,897 B2
(45) Date of Patent: Apr. 6, 2021

(54) METHOD AND DEVICE FOR OPERATING CAPACITIVE TOUCH PANEL

(71) Applicant: MIRAENANOTECH CO., LTD., Cheongju-si (KR)

(72) Inventor: Oh-Kyong Kwon, Seoul (KR)

(73) Assignee: MIRAENANOTECH CO., LTD., Cheongju-si (KR)

( * ) Notice: Subject to any disclaimer, the term of this patent is extended or adjusted under 35 U.S.C. 154(b) by 0 days.

(21) Appl. No.: 16/240,323

(22) Filed: Jan. 4, 2019

(65) Prior Publication Data

US 2019/0138148 A1 May 9, 2019

Related U.S. Application Data

(63) Continuation-in-part of application No. 15/324,537, filed as application No. PCT/KR2015/007003 on Jul. 7, 2015, now abandoned.

(30) Foreign Application Priority Data

Jul. 8, 2014 (KR) ........................ 10-2014-0085397

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0446* (2019.05); *G06F 3/041661* (2019.05)

(58) Field of Classification Search
CPC combination set(s) only.
See application file for complete search history.

(56) References Cited

U.S. PATENT DOCUMENTS

| 2008/0158167 A1* | 7/2008 | Hotelling ............. G06F 3/0416 345/173 |
| 2010/0156805 A1 | 6/2010 | Brand et al. |
| 2012/0169660 A1 | 7/2012 | Seo |

(Continued)

FOREIGN PATENT DOCUMENTS

| KR | 10-2012-0078072 A | 7/2012 |
| KR | 10-2013-0051877 A | 5/2013 |
| KR | 10-2014-0073827 A | 6/2014 |

OTHER PUBLICATIONS

International Search Report for application No. PCT/KR2015/007003 dated Oct. 15, 2015.

(Continued)

*Primary Examiner* — Robin J Mishler
(74) *Attorney, Agent, or Firm* — Sughrue Mion, PLLC (57) ABSTRACT

In the touch panel device and the operating method for the same according to the present invention, an entire scan is divided into a first scan and a second scan for determining a touch position. In the first scan, a plurality of transmission electrodes are configured into groups, and a signal is applied sequentially or simultaneously such that a first analysis position is determined. In the second scan, since a signal is sequentially or simultaneously applied only to the first analysis position, a plurality of sampling durations can sufficiently be provided such that a second analysis position, which is the exact touch position, can be determined.

5 Claims, 7 Drawing Sheets

(56) References Cited

U.S. PATENT DOCUMENTS

2013/0050116 A1\* 2/2013 Shin .................. G06F 3/044
                                                    345/173
2014/0362040 A1   12/2014 Mo et al.
2017/0199022 A1\* 7/2017 Anderson .......... H03K 17/955

OTHER PUBLICATIONS

Written Opinion for application No. PCT/KR2015/007003 dated Oct. 15, 2015.
Non-Final Office Action received in U.S. Appl. No. 15/324,537 dated Sep. 4, 2018.

\* cited by examiner

METHOD AND DEVICE FOR OPERATING CAPACITIVE TOUCH PANEL

TECHNICAL FIELD

The present invention relates to a method and a device for operating a capacitive touch panel and, more particularly, to a coarse/fine sensing method in which a second analysis position is determined by determining a first analysis position through a first scan and performing a second scan in which a signal is applied only to the first analysis position determined through the first scan.

BACKGROUND ART

Personal computers, mobile communications devices, and other personal information processing devices, etc. each utilize various input devices, such as a keyboard, mouse, digitizer, etc. for user interfacing. With expanding mobile communications device development, because it is difficult to make a complete product with input devices such as the keyboard and mouse, there is an ever-increasing need for input devices which are simpler, can reduce occurrence of malfunction, and are portable. Responding to such a need, a touch panel is proposed in which information is input by a user directly by touching a screen with a finger or a pen.

Touch panels have been and are currently being applied to various information processing devices, due to advantages of simplicity, having few malfunctions, providing excellent portability due to text input being possible without a separate input device, and ease with which a user can learn the method of use.

Touch panels are classified into a few main types according to the method of sensing. In the resistive type, metal electrodes are formed at an upper or lower plate and, with an applied DC voltage, a touch position is determined using voltage level that depends on resistance. In the capacitive type, an equipotential state is formed in a conductive film, and a touch position is sensed by sensing a position at which a voltage change has occurred between upper and lower plates due to a touch. In the electromagnetic type, an LC value induced by touching operation between an electric pen and a conductive film is read for sensing a touch position.

Figure 1:
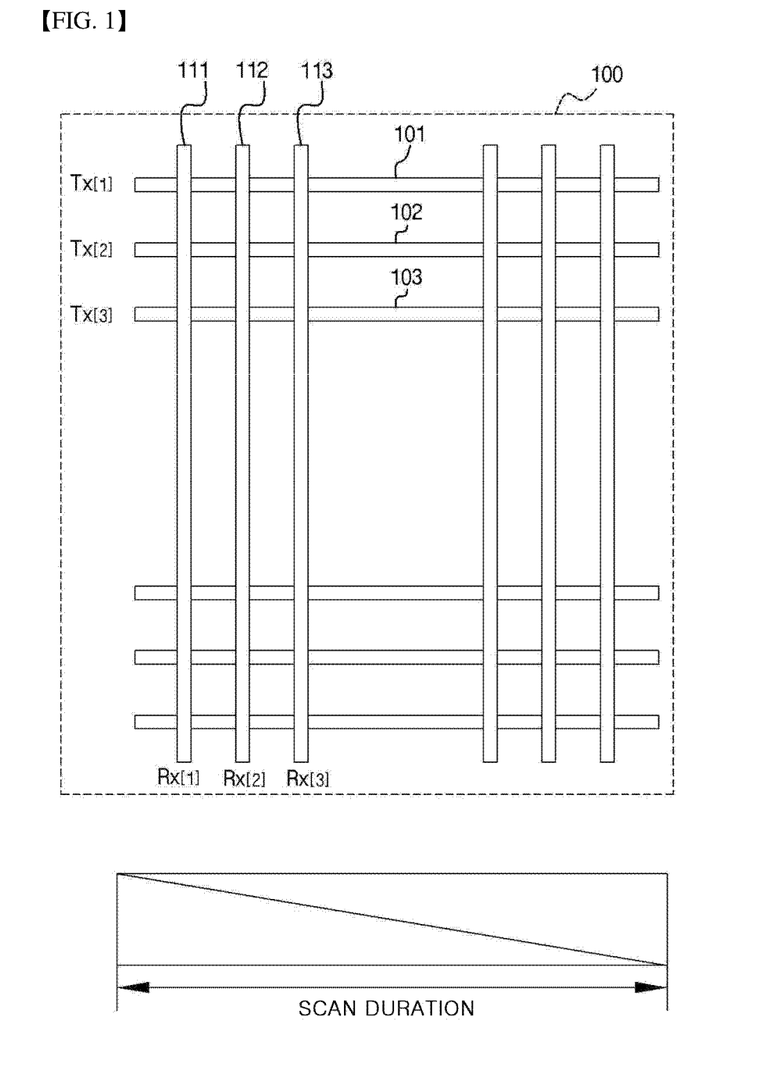
FIG. 1 is a diagram for explaining a typical touch panel operation device for explaining a touch panel operation method according to a conventional art.

FIG. 1 is a diagram of an electrode structure of a typical touch panel for explaining a method of operation of a touch panel according to a conventional art. Referring to FIG. 1, a touch sensor 100 is formed with a plurality of transmission electrodes 101, 102, 103 perpendicularly crossing a plurality of receiving electrodes 111, 112, 113. The touch sensor 100 configured as such senses coordinates corresponding to a touched portion using a capacitive change generated at a crossing between a transmission electrode and a receiving electrode due to a touch. Here, the capacitive change is detected by detecting a transmission electrode and a receiving electrode whose voltage level has changed due to the capacitive change.

There are two methods of operation for such a touch panel. The first is the scan driving method in which a signal is sequentially applied to each of a plurality of transmission electrodes. The second is the multi-line selection driving method in which a signal is simultaneously applied to a plurality of transmission electrodes.

In the scan driving method, a signal is sequentially applied to a plurality of transmission electrodes 101, 102, 103 during an entire scan. Each voltage level of the plurality of transmission electrodes 101, 102, 103 is sequentially determined for detecting a transmission electrode with a changed voltage level, among the transmission electrodes 101, 102, 103. Then, among the plurality of receiving electrodes 111, 112, 113, a receiving electrode with a changed voltage level is detected by sequentially determining the voltage level of each of the receiving electrodes 111, 112, 113. Then, coordinates are deduced by combining the position of the detected transmission electrode and receiving electrode, and the deduced coordinates correspond to the capacitive change corresponding to the touched portion.

In the multi-line selection driving method, a signal is simultaneously applied to a plurality of transmission electrodes 101, 102, 103 during an entire scan. Among the plurality of transmission electrodes 101, 102, 103, a transmission electrode with a changed voltage level is detected, and a receiving electrode with a changed voltage level is detected among the plurality of receiving electrodes by determining voltage levels of the plurality of receiving electrodes 111, 112, 113. Then, coordinates are deduced by combining the positions of the detected transmission electrode and receiving electrode, and the deduced coordinates correspond to the capacitive change corresponding to the touched position.

However, in the scan driving method, with increasing resolution of the capacitive touch panel, there may be a limitation imposed on driving duration, and in the multi-line selection driving method, there is a disadvantage of increased power consumption due to having to simultaneously drive all channels.

DISCLOSURE OF INVENTION

Technical Problem

The present invention is for solving the above problems of the conventional technology. That is, an entire scan is divided into a first scan and a second scan for determining a touch position. In the first scan, a plurality of transmission electrodes form a group, and a signal is sequentially or simultaneously applied for determining a first analysis position. The present invention is directed to providing a coarse/fine sensing method in which a second analysis position is determined by sequentially or simultaneously applying a signal only to the first analysis position in the second scan.

Technical Solution

The present invention for solving the above problems provides a touch panel device including a driver for generating a transmission signal for detecting a touch action; a touch sensor having a plurality of transmission electrodes intersecting with a plurality of receiving electrodes and forming a receiving signal according to a touch action; a receiving processor for receiving the receiving signal and outputting a signal for determining a touch position; and a coarse/fine sensing processor for determining a first analysis position by the signal inputted from the receiving processor and determining a second analysis position by applying a signal to the determined first analysis position.

Advantageous Effects

According to the present invention, whereas duration assigned to each transmission electrode decreases with increasing number of transmission electrodes in the conventional scan driving method in which a signal is sequentially applied to all transmission electrodes, sufficient duration may be assigned to a single transmission electrode and touch position accuracy may be increased through multiple samplings, in the coarse/fine sensing method.

Also, whereas power consumption increases with increasing number of transmission electrodes in the conventional multi-line selection driving method in which a signal is simultaneously applied to all transmission electrodes, power consumption may be decreased in the coarse/fine sensing method according to the present invention because a first analysis position is detected and multiple samplings are performed only at the first analysis position.

Technical effects of the present invention are not limited to the effects mentioned afore, and unmentioned other technical effects may clearly be understood by a person of ordinary skill in the art from the hereinafter description.

MODE OF INVENTION

While the present invention can be modified in various ways and implemented in many forms, specific embodiments are described in the drawings and explained in detail. However, there is no intent to limit the present invention to the specific disclosure, and it should be understood that the present invention includes all modifications, equivalents, and alternatives included in the idea and technical scope thereof. In describing each of the drawings, like reference numerals are used to denote like elements.

Unless otherwise defined, all terms including technical and scientific terms used herein each have the same meaning generally understood by those of ordinary knowledge in the art to which the present invention belongs. Generally used terms, such as terms defined in dictionaries, should each be interpreted by a meaning consistent with the context of related technologies and should not be interpreted by an ideal or excessively formal meaning unless clearly defined so in the present invention.

Hereinafter, exemplary embodiments of the present invention will be described in further detail with references to accompanying drawings.

Embodiment

Figure 2:
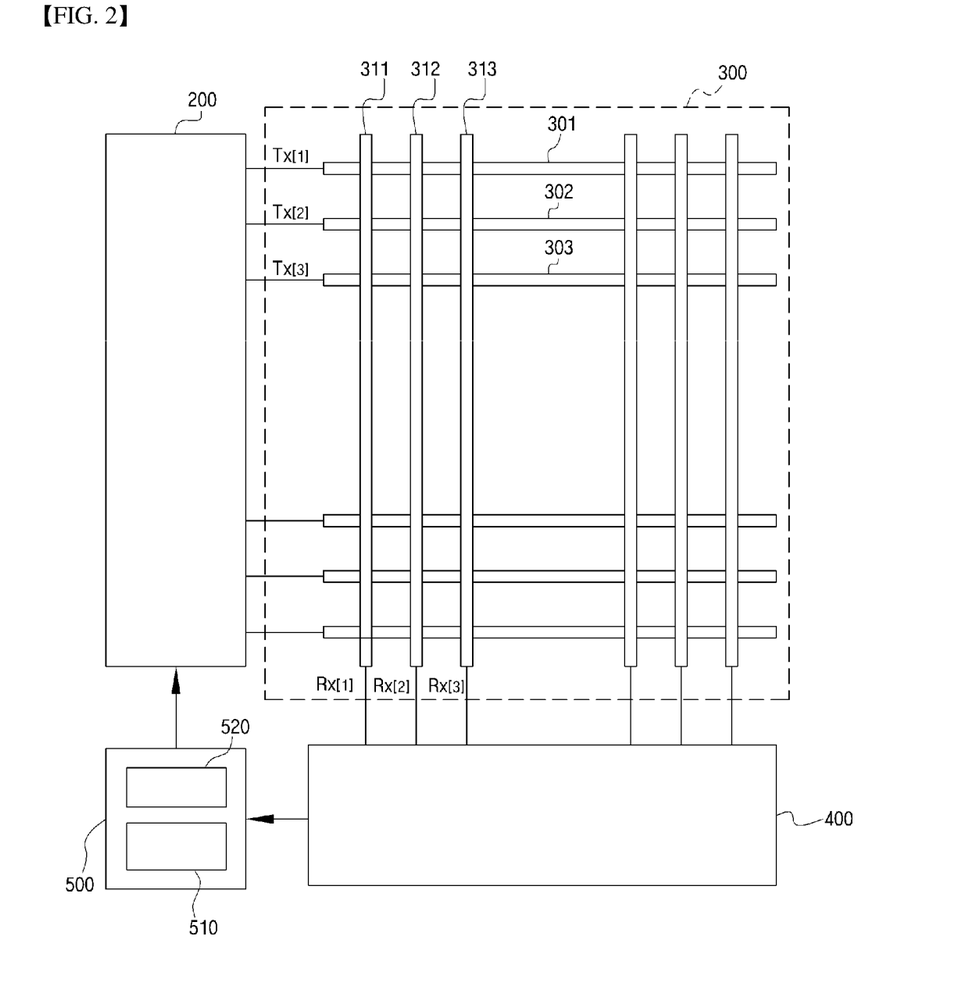
FIG. 2 is a block diagram for explaining a touch panel operation device according to an embodiment of the present invention.

FIG. 2 is a block diagram for explaining a touch panel operation device according to an embodiment of the present invention.

Referring to FIG. 2, a touch panel device includes a driver 200, a touch sensor 300, a receiving processor 400, and a coarse/fine sensing processor 500, and the coarse/fine sensing processor 500 includes a discriminator 510 and a controller 520.

The driver 200 applies a transmission signal to a plurality of transmission electrodes 301, 302, 303 for discriminating a touch action detection using a coarse/fine sensing method having a first scan (coarse sensing duration) and a second scan (fine sensing duration). During the first scan, a transmission signal is applied sequentially or simultaneously to a plurality of transmission electrodes 301, 302, 303 divided into groups, and during the second scan, a transmission signal is applied sequentially or simultaneously to a first analysis position determined during the first scan.

The touch sensor 300 has a plurality of transmission electrodes 301, 302, 303 and a plurality of receiving electrodes 311, 312, 313. Each of the transmission electrodes 301, 302, 303 is arranged perpendicularly with respect to each of the receiving electrodes 311, 312, 313, and capacitance is formed at each crossing position. Also, the transmission electrodes 301, 302, 303 are extended in a first direction and have a uniform separation distance between each other. Also, the receiving electrodes 311, 312, 313 are extended in a second direction substantially perpendicular to the first direction and have a uniform separation distance between each other. A transmission signal from the driver 200 is applied to each of the transmission electrodes 301, 302, 303, and a receiving signal is output at each of the reception electrodes 311, 312, 313.

The receiving processor 400 is input with a first detection receiving signal output from the touch sensor due to the first scan and a second detection receiving signal due to the second scan through each of the reception electrodes 311, 312, 313 and outputs a signal for determining a touch position of each thereof.

The coarse/fine sensing processor 500 includes the discriminator 510 and the controller 520. The coarse/fine sensing processor determines a touch position by being input with a signal output from the receiving processor 400 for determining a touch position outputs a signal to the driver 200 for performing a first scan and a second scan.

The discriminator 510 of the coarse/fine sensing processor 500 is input with the first detection receiving signal output from the receiving processor 400 to approximately determine a touch position and determines an exact touch position by being input with the second detection receiving signal. Here, the approximate touch position estimated from the first detection receiving signal output is called a first analysis position, and the exact touch position determined from the second detection receiving signal is called a second analysis position.

The controller 520 of the coarse/fine sensing processor 500 receives a first detection receiving signal from the discriminator 510 and determine a first analysis position and outputs a signal for applying a second detection receiving signal to the determined analysis position through the driver 200.

Figure 3:
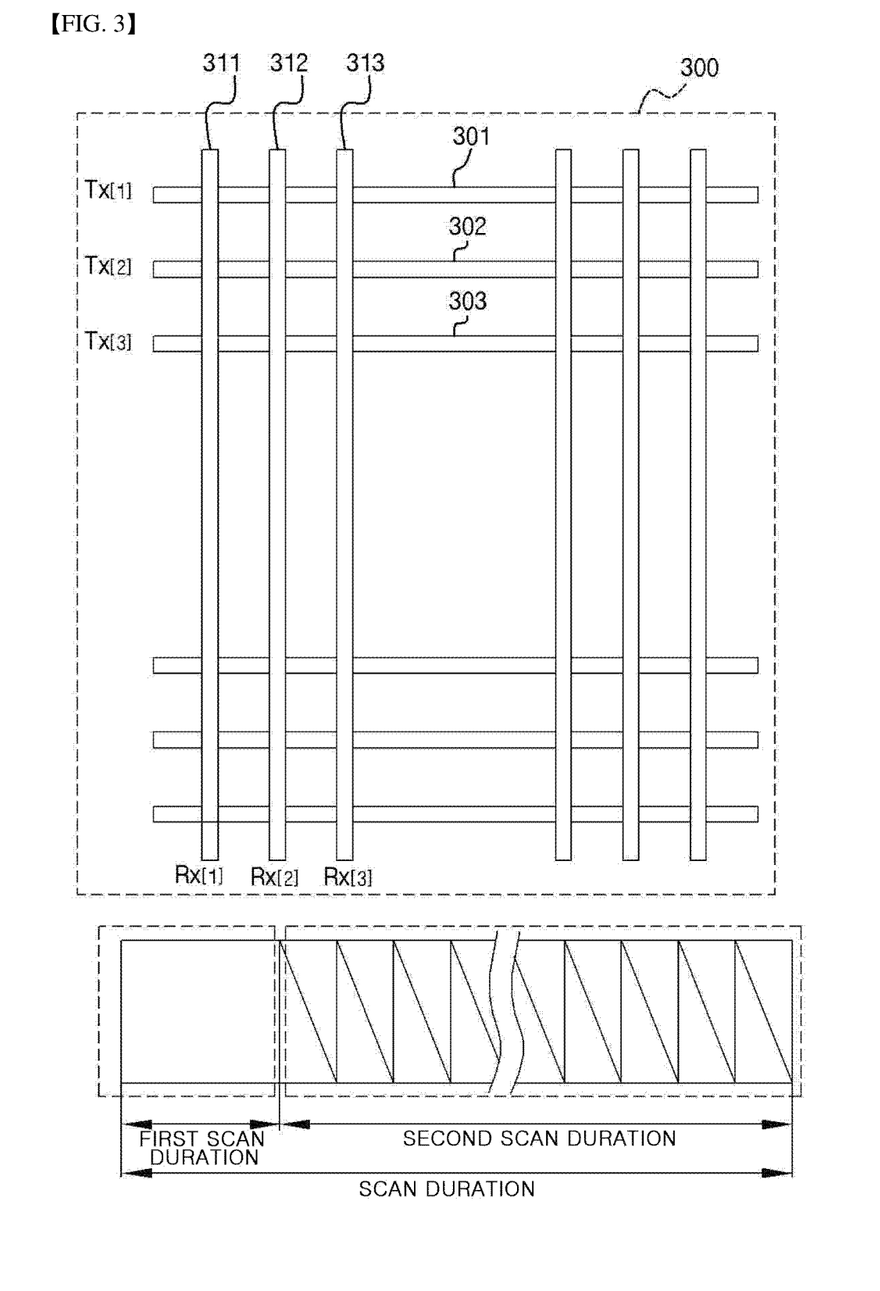
FIG. 3 is a diagram for explaining a touch panel operation method according to an embodiment of the present invention.
Figure 4:
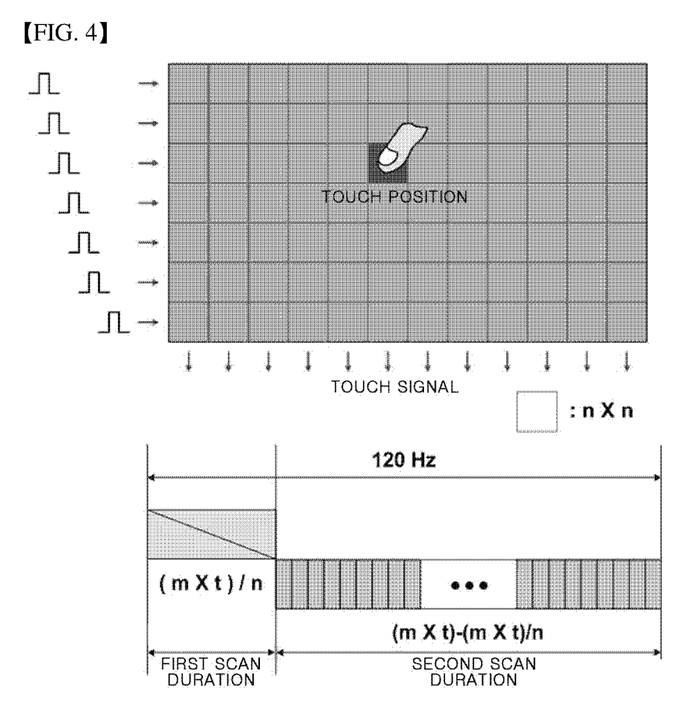
FIG. 4 is a diagram for explaining operation duration according to an embodiment of the present invention.

FIG. 3 is a diagram for explaining a touch panel operation method according to an embodiment of the present invention, and FIG. 4 is a diagram for explaining operation duration according to an embodiment of the present invention.

Referring to FIGS. 3 and 4, an entire scan may be divided into a first scan and a second scan for determining a touch detection position. In the first scan, the plurality of transmission electrodes 301, 302, 303 are divided into a plurality of groups and the driver 200 applies a signal for sampling to the touch sensor 300. The applying of signal from the driver 200 to the touch sensor 300 may occur sequentially or simultaneously.

When a signal is applied to the plurality of transmission electrodes 301, 302, 303 of the touch sensor 300, capacitance changed at the crossings of the plurality of transmission electrodes 301, 302, 303 and the plurality of receiving electrodes 311, 312, 313 are output through each of the receiving electrodes 311, 312, 313. The output signal output through each of the receiving electrodes 311, 312, 313 are input to the receiving processor 400, and the receiving processor 400 outputs the first detection receiving signal to the coarse/fine sensing processor 500.

The discriminator 510 of the coarse/fine sensing processor 500 is input with a first detection receiving signal and determines a first analysis position. When a first analysis position is determined through the discriminator 510, the controller 520 of the coarse/fine sensing processor 500 controls the driver 200 so that a scan signal is applied only to the determined first analysis position. Here let m be the duration for scanning a plurality of transmission electrodes 301, 302, 301 and t be the duration for scanning a single transmission electrode. Assuming dividing the plurality of transmission electrodes 301, 302, 303 into n groups, of the entire scan duration m×t, the duration for a first scan is (m×t)/n.

When a first analysis position is determined by the discriminator 510, the first scan is finished, and a second scan is initiated through the controller 520.

During a second scan, driver 200 is controlled by the controller 520 so that signals for multiple samplings are only applied to a transmission electrode located at the first analysis position. The signal from the driver 200 applied to the touch sensor 300 may be sequentially or simultaneously applied.

Of the entire scan duration, the duration for a second scan corresponds to the entire scan duration m×t with (m×t)/n subtracted therefrom. That is, because signal is applied only to the first analysis position of the transmission electrodes during (m×t)−(m×t)/n duration, the number of multiple samplings for determining the second analysis position may be increased.

As an example, when the touch sensor 300 includes 70 transmission electrodes 301, 302, 303 and 120 receiving electrodes 311, 312, 313 and a plurality of transmission electrodes 301, 302, 303 are configured into groups of 7, in the coarse/fine sensing method, a signal in group units of 7 is applied to have a first scan duration of 10×t, and a first analysis position is determined through the first scan. Also, a second analysis position is determined by performing sampling during the second scan duration of 60×t in which the first scan duration is subtracted from an entire scan duration of 70×t.

When the plurality of transmission electrodes are configured into groups of 7, because a matrix for second scan becomes 7×7, the number of samplings of a transmission electrode while driving with a simultaneous driving method after sampling a matrix is 53×t which is a duration resulting from subtracting 7×t which is a duration for sampling one matrix when a 7×7 matrix is used during 60×t which is the second scan duration. Accordingly, the coarse/fine sensing method has 53-fold increase in the number of samplings compared to the conventional scan drive method, and accuracy for the touch position may thus be increased.

Also, because 7×7 matrices into which a plurality of transmission electrodes divided into groups of 7 are used, the number of matrices for determining a position is decreased to 0.58% of a conventional multi-line selection method which uses 120×7 matrices, and because the number of signals applied from driver 200 to touch sensor 300 is reduced from 70 to 7, power consumption is reduced to 10%.

Figure 5:
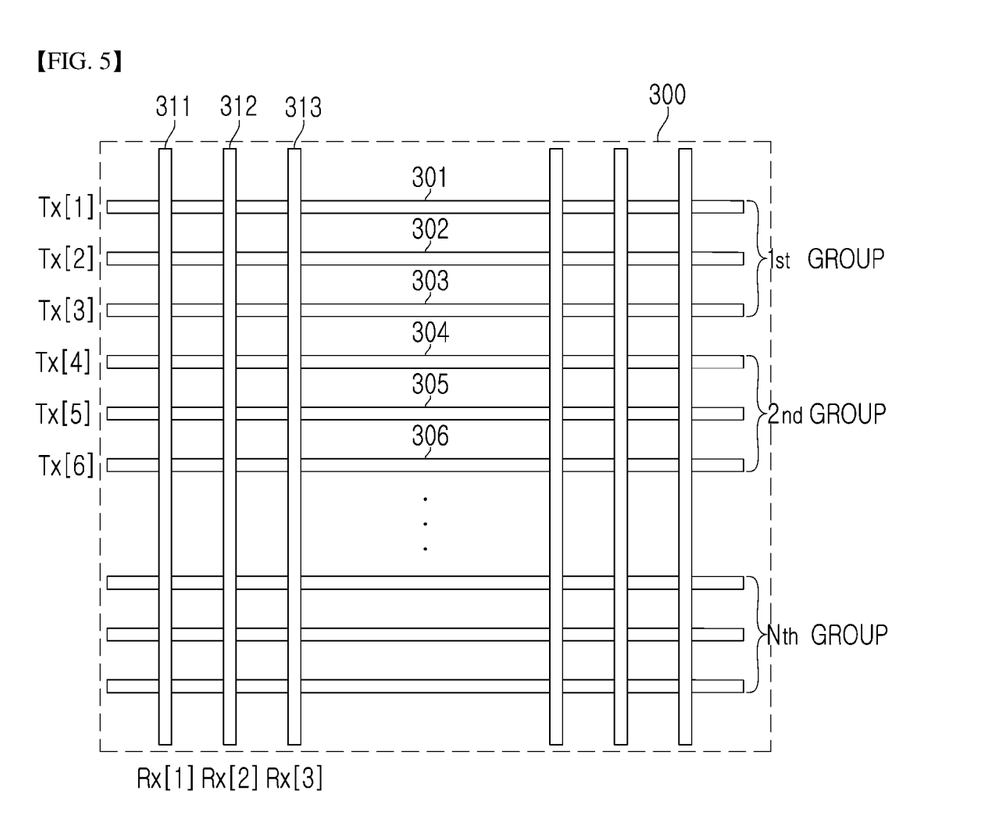
FIG. 5 is another diagram for showing a touch panel operating method using a coarse/fine sensing method according to an embodiment of the present invention.

FIG. 5 is another diagram for showing a touch panel operating method using a coarse/fine sensing method according to an embodiment of the present invention.

Referring to FIG. 5, transmission electrodes of the touch panel are divided into a plurality of groups, and two scan operations are performed. In the first scan operation, the first scan signals are simultaneously applied to all the groups, and the first analysis position is determined. A second scan operation is performed after the first scan operation, and a second scan signals are simultaneously applied to the first analysis position in the second scan operation, thereby determining the second analysis position.

The first scan signals refer to transmission signals applied during a first scan operation period and the second scan signals refer to transmission signals applied during a second scan operation period. In addition, the first detection receiving signals are output through the receiving electrodes in accordance with the applied first scan signals, and the second detection receiving signals are output through the receiving electrodes in accordance with the second scan signals.

When the first scan operation is performed, the transmission electrodes to which the same transmission signals having the same frequency from each other are applied are determined as one group. That is, a specific group is determined to be the first analysis position where the touch operation is performed through the first scan operation. The first analysis position does not indicate the exact point where touch action is performed, and refers to a specific group to which a touch point belong.

For example, first transmission electrode 301, second transmission electrode 302, and third transmission electrode 303 can be set to the first group, and fourth transmission electrode 304, fifth transmission electrode 305, and sixth transmission electrode 306 can be set to the second group. That is, one group may be composed of three adjacent transmission electrodes. It is possible to set up to the Nth group.

Furthermore, the same transmission signals are applied to one group. For example, the first transmission signal Tx[1], the second transmission signal Tx[2] and the third transmission signal Tx[3] are simultaneously applied in the same form. The transmission signals applied to the transmission electrodes constituting the other group are simultaneously applied with the same frequency to each other. However, the frequencies of the transmission signals are different for each group, and are simultaneously applied to all the groups. If transmission signals having a first frequency are applied to the first group, the transmission signals having a second frequency different from the first frequency are applied to the second group. In addition, the transmission signals having the first frequency and the transmission signals having the second frequency are not applied sequentially but applied at the same time. This applies to all groups.

That is, during the first scan operation period, the transmission signals having the same frequency are applied the same group, transmission signals having different frequencies are applied to different groups, the transmission signals having N frequencies are simultaneously applied to all groups. Whereby the first analysis position is determined.

After the first scan operation, a second scan operation is performed on the group corresponding to the first analysis position. If the second group is determined as the first analysis position, the second scan operation is performed only for the second group, and the transmission signal is applied. In FIG. 5, the transmission signals are applied only to the fourth transmission electrode 304, the fifth transmission electrode 305, and the sixth transmission electrode 306 which are the second group.

Also, the transmission signals applied to the group corresponding to the first analysis position are simultaneously applied, and have different frequencies. For example, when the second group is determined to be the first analysis position, transmission signals are applied only to the fourth transmission electrode 304, the fifth transmission electrode 305, and the sixth transmission electrode 306, They have different frequencies and are applied simultaneously.

If the touch operation is performed at the intersection of the fifth transmission electrode 305 and the second receiving electrode 312, the detection receiving signal Rx[2] received at the second receiving electrode 312 has different levels than the detection receiving signals Rx[1] and Rx[3] received at first receiving electrode 311 and third receiving electrode 313. Through the determination of the second analysis position, an accurate touch point can be determined.

In FIG. 5, all the transmission electrodes of the touch panel are divided into a plurality of groups, and may be divided into N groups.

In the first scan operation, a first scan signals having a different frequency are applied to each of the groups as the transmission signals and are simultaneously applied. The first scan signals are the transmission signals applied during the first scan operation. Also, the transmission signals in one group all have the same frequency. And, transmission signals having different frequencies are applied different groups, and the transmission signals applied to one group are simultaneously applied with the same frequency.

Also, the transmission signals in all the groups are simultaneously applied. However, the frequencies of the transmission signals applied to the groups are different from each other.

A Fast Fourier Transform (FFT) operation is performed on the first detection receiving signals received in the first scan operation. That is, the first to Nth frequency components included in the receiving signals are converted to determine a variation of a signal out of the normal range at a specific frequency. Thus, it is determined whether or not a touch is generated in the group to which the specific frequency is supplied. The frequency at which the variation of the signal is generated by the touch operation indicates specific group in which the touch operation is generated. Whereby the first analysis position is determined.

Then, a second scan signals for the first analysis position are applied. That is, the scan signals are not applied to other groups than the specific group corresponding to the first analysis position, and the second scan signals are applied only to a specific group corresponding to the first analysis position. The applied second scan signals are simultaneously applied to the transmission electrodes forming a specific group, and have different frequencies and are simultaneously applied.

The discriminator processes signals of different frequencies through a Fast Fourier Transform and detects a signal that deviates from a reference value or deviates from a reference range at a specific frequency. Accordingly, it is possible to determine the accurate touch point by discriminating the transmission electrode and the receiving electrode corresponding to a specific frequency.

Figure 6:
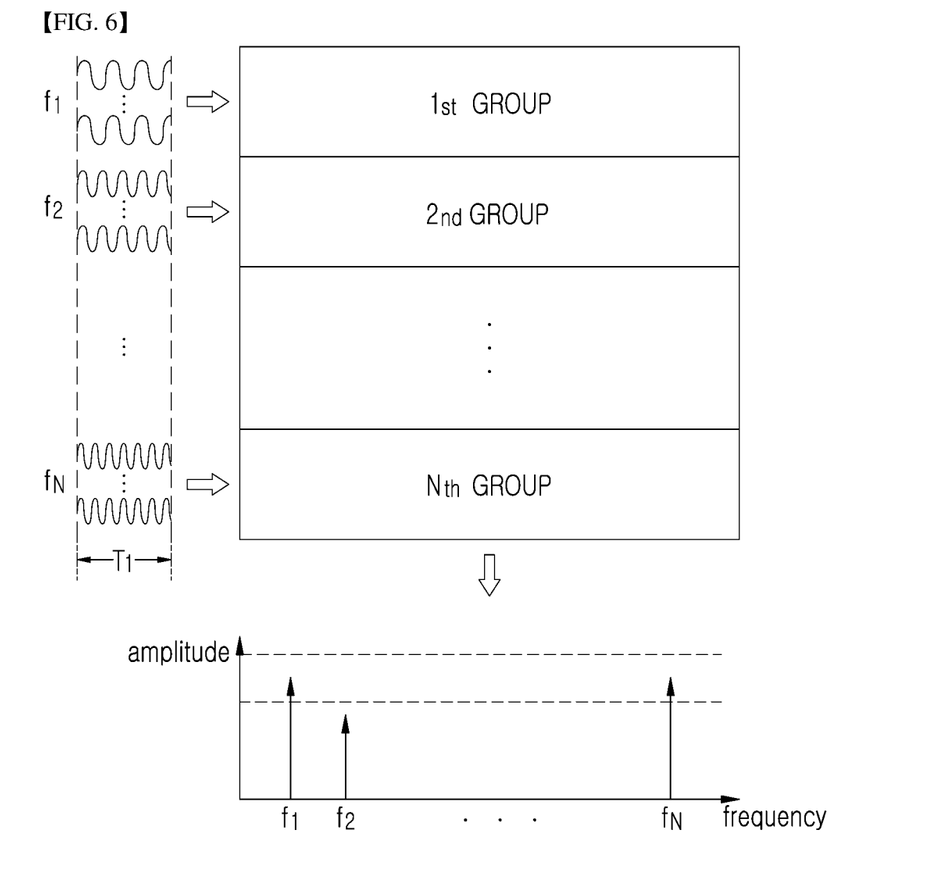
FIGS. 6 and 7 are schematic diagrams for explaining a method of operating a touch panel using the coarse/fine sensing method of FIG. 5 according to an embodiment of the present invention.
Figure 7:
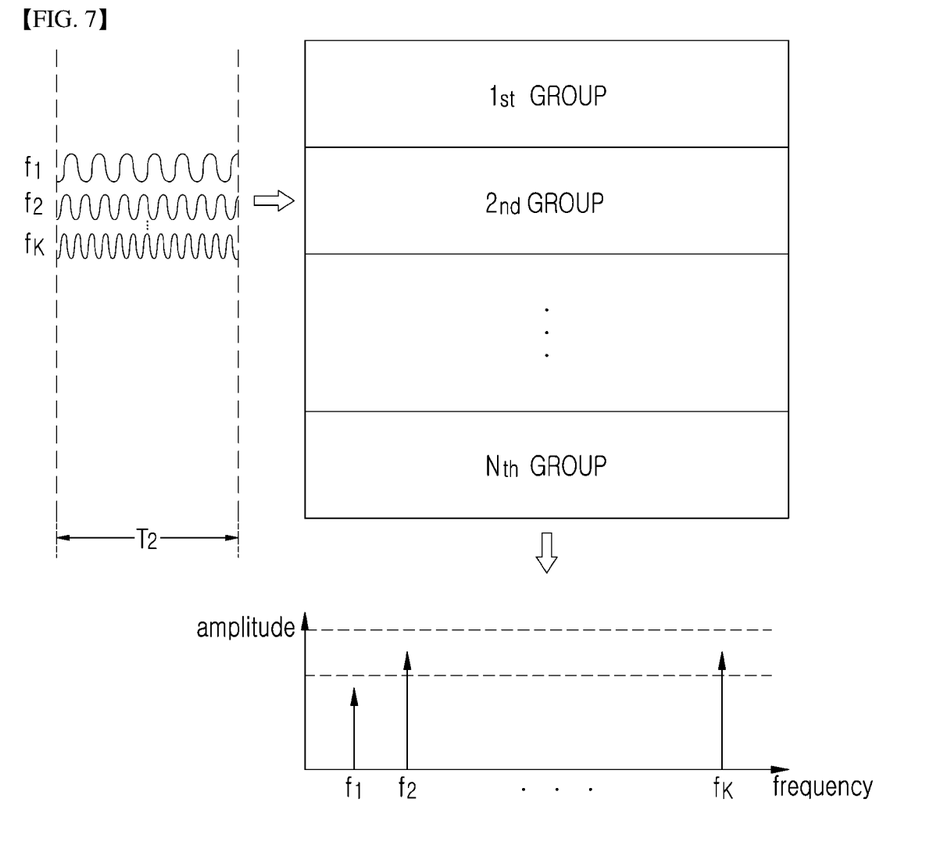

FIGS. 6 and 7 are schematic diagrams for explaining a method of operating a touch panel using the coarse/fine sensing method of FIG. 5 according to an embodiment of the present invention.

Referring to FIG. 6, the touch sensor is divided into N groups, and the transmission electrodes are divided into N groups.

The first scan signals are simultaneously applied to the N groups. The frequencies of the first scan signals applied to all groups are different from each other. That is, transmission signals having the first frequency $f_1$ are applied to the first group, and transmission signals having the Nth frequency $f_N$ are applied to the Nth group. Also, transmission signals having different frequencies are all applied at the same time. That is, the transmission signals are simultaneously applied to the respective groups, and transmission signals of different frequencies are applied to different groups. Also, transmission signals having the same frequency are simultaneously applied in one group.

When first scan signals are applied, signal in which a plurality of frequency components are mixed is received on one receiving electrode. That is, signals having N frequencies mixed are received at each of the receiving electrodes. The first detection receiving signals are analyzed by the discriminator. Preferably, the received first detection receiving signals are analyzed with N frequency components through a Fast Fourier Transform. It is determined whether the Fast Fourier Transform value in the specific frequency spectrum is included in the reference value or the reference range. If a particular frequency component deviates from the normal value range, the corresponding group is determined as the first analysis position. The first analysis position can be determined only by supplying one scan signal.

Referring to FIG. 7, the second scan operation for the first analysis position according to the first scan operation of FIG. 6 is performed. The second scan operation is an operation of supplying second scan signals to the specific group corresponding to the first analysis position and receiving signals at the receiving electrodes. The second scan signals are applied only to the specific group determined as the first analysis position, and the second scan signals are not applied to the other groups.

In FIG. 7, the second group is determined to be the first analysis position, and the first analysis position may be determined differently depending on the point at which the touch action is performed on the touch panel. In accordance with the second scan operation, the second scan signals are simultaneously applied to the first analysis position. The second scan signals, which are transmission signals, are simultaneously applied to all the transmission electrodes constituting the specific group corresponding to the first analysis position, and frequencies are set differently from each other. Accordingly, the second detection receiving signals appear as mixed signals of frequencies equal to the number of transmission electrodes constituting the second group. The second detection receiving signals are converted to a frequency spectrum by the Fast Fourier Transform in discriminator or the like. The converted frequency spectrum shows the magnitude of the amplitude for each frequency included in the second scan signal, so that the frequency component that deviates from the reference level or the reference range is analyzed. Therefore, a specific frequency out of reference range can be determined and the position of the corresponding transmission electrode and receiving electrode can be determined. Whereby the second analysis position is also determined.

Accordingly, in the first scan operation, the transmission signals are simultaneously applied to all the transmission electrodes, and the first scan signals, which are transmission signals having different frequencies, are applied to all the groups. Whereby a first analysis position corresponding to a specific group is determined.

Also, a second scan operation is performed on the first analysis position determined by the first scan operation. In the second scan operation, the second scan signals are simultaneously applied to one group corresponding to the first analysis position. The second scan signals are applied with different frequencies for each of the transmission electrodes. It can be determined through the Fast Fourier Transform that the touch action has been performed at the transmission electrode and the receiving electrode to which a specific frequency is supplied.

Therefore, touch point is determined accurately and quickly through two scan operations. Also, in the first scan operation, the first scan signals are simultaneously applied to all the groups, supplied with different frequencies for each group, and in the second scan operation, the second scan signals are simultaneously applied to the specific group. Therefore, the touch point can be confirmed very quickly and accurately.

Furthermore, in the present invention, approximate touch point may be determined by the first scan operation, and then the second scan operation for the first analysis position may be performed a plurality of times to determine the second analysis position, thereby obtaining a plurality of Fast Fourier Transform data for the first analysis position.

So, noise of the touch signal is reduced through the average of the obtained Fast Fourier Transform data, and the accuracy of the touch point can be improved.

The operating method of the capacitive touch panel device described above according to the present invention divides an entire scan into a first scan and a second scan, determines a first analysis position by dividing a plurality of transmission electrodes 301, 302, 303 into groups and applying a signal sequentially or simultaneously thereto, and detects a second analysis position through multiple samplings by sequentially or simultaneously applying a signal to the first analysis position during the second scan.

Accordingly, whereas duration allotted for a single transmission electrode decreases with increasing number of transmission electrodes in the conventional scan driving method in which a signal is sequentially applied to all transmission electrodes, in the coarse/fine sensing method according to the present invention, duration allotted for a single transmission electrode can sufficiently be provided, and accuracy of a touch position may be increased through multiple samplings.

Accordingly, whereas power consumption increases with increasing number of transmission electrodes in the conventional multi-line selection method in which a signal is simultaneously applied to all transmission electrodes, because a first analysis position is detected through a first scan and multiple sample is performed only on the first analysis position, power consumption is reduced in the coarse/fine sensing method according to the present invention.

Meanwhile, embodiments of the present invention shown in the present disclosure and drawings are for enhancing understanding and are not intended to limit the scope of the present invention. It is clear to a person with ordinary knowledge in the art to which the present invention belongs that other modified embodiments based on the technical concepts of the present invention are possible besides the disclosed embodiments.

The invention claimed is:

1. A touch panel device for detecting a touch position receiving a touch, the device comprising:
   a touch sensor comprising a plurality of transmission electrodes and a plurality of receiving electrodes, the transmission electrodes perpendicularly intersecting with the receiving electrodes, and the transmission electrodes being grouped into a plurality of groups such that each group includes at least two transmission electrodes;
   a driver configured to simultaneously apply first scan signals having different frequencies to the groups once, each of the first scan signals being applied to each of the groups, respectively, and to apply second scan signals having different frequencies to a touch group among the groups more than once;
   a processor configured to receive touch signals from the receiving electrodes; and
   a controller configured to:
      determine the touch group based on the touch signal corresponding to the first scan signals, and
      determine a touch position in the touch group based on the touch signal corresponding to the second scan signals.

2. The device of claim 1, wherein the transmission electrodes are placed at predetermined intervals between each other.

3. The device of claim 1, wherein the receiving electrodes are placed at predetermined intervals between each other.

4. The device of claim 1, wherein the controller is configured to detect variation of capacitance at the intersection of the transmission electrodes of the touch group and the one of the receiving electrodes to determine the touch group.

5. The device of claim 1, wherein the controller is configured to detect variation of capacitance at the intersection of one of the transmission electrodes of the touch group and the one of the receiving electrodes to determine the touch position.

* * * * *